United States Patent [19]

Lee

[11] Patent Number: 5,586,818
[45] Date of Patent: Dec. 24, 1996

[54] THREE DIMENSIONAL PROJECTION SYSTEM

[75] Inventor: Dong-Hee Lee, Seoul, Rep. of Korea

[73] Assignee: Daewoo Electronics Co., Ltd., Seoul, Rep. of Korea

[21] Appl. No.: 601,437

[22] Filed: Feb. 14, 1996

[30] Foreign Application Priority Data

Feb. 15, 1995 [KR] Rep. of Korea .................. 95-2741

[51] Int. Cl.$^6$ .................. G03B 21/00; G02B 7/04
[52] U.S. Cl. .................. 353/101; 353/100; 359/822; 359/823; 359/696
[58] Field of Search .................. 353/100, 101, 353/7; 359/694, 696, 703, 819, 822, 823, 824, 826, 827

[56] References Cited

U.S. PATENT DOCUMENTS

| | | | |
|---|---|---|---|
| 5,125,733 | 6/1992 | Lee | 353/7 |
| 5,140,468 | 8/1992 | Kayanuma | 359/696 |
| 5,202,706 | 4/1993 | Hasegawa | 359/694 |

*Primary Examiner*—William Dowling
*Attorney, Agent, or Firm*—Foley & Lardner

[57] ABSTRACT

Disclosed is a three dimensional projection system. A holder housing has upper and lower plates and a plurality of longitudinally inclined guiding holes inclined at predetermined angles about central axes of the upper and lower plates. First and second projecting lens holders have cylindrical shapes and are provided with projecting lenses in front sides thereof. Movable pins protrusively formed on upper and lower portions of the first and second projecting lens holders are provided. The movable pins are respectively inserted into corresponding longitudinally inclined guiding holes. A holder supporting plate has a pair of front and rear plates and a spacer. The front and rear plates are provided with first and second leg portions formed at both sides thereof and extended onto an upper portion of the upper plate, and third and fourth leg portions extended onto a lower portion of the lower plate. A driving motor for supplying driving power for transporting the projecting lens holders is provided. And transporting apparatus for transporting the driving power to the projecting lens holders is provided. The operation of the system is advantageous and the keystoning phenomenon is eliminated.

11 Claims, 7 Drawing Sheets

THREE DIMENSIONAL PROJECTION SYSTEM

BACKGROUND OF THE INVENTION

1. Field of the Invention

The present invention relates to a three dimensional projection system, and more particularly to a three dimensional projection system in which image adjusting operation as well as focus regulating operation for obtaining an image on a screen could be performed simultaneously by operating a pair of projecting lenses integrally by using a single driving motor, thereby removing a keystoning phenomenon.

2. Description of the Prior Art

There are various kinds of three dimensional color projection systems and/or display systems. One peculiar approach has two projectors or display systems, where one projector provides a right eye display and the other a left eye display on a screen. Each display has its own polarization, for instance, "P" and "S", respectively. The viewer wears polarized spectacles which let the eyes see a stereoscopic display for three dimensional viewing.

Generally, a stereoscopic apparatus is used for accomplishing the above-mentioned three dimensional display. This apparatus includes a pair of projecting units which are provided in front of the screen while keeping at a predetermined distance. Two projecting units project the same object so that their picturing angles are different from each other on the screen to overlap thereon and the overlapped images are perceived by the eyes through the polarized glasses for three dimensional viewing.

However, in such a kind of three dimensional projection system utilizing the two-beam separating method, if the distance between the screen and each of projecting unit and/or the distance between the projecting units, are not adjusted exactly, the two projected images through each of the projecting unit will be out of focus so that a misoverlapped image is formed on the screen, or so that a complete image is not formed on the screen.

FIG. 1 is a schematic constitution view for showing the above-mentioned conventional three dimensional projection system. It will be described in detail below.

The conventional three dimensional projection system mainly has first and second projecting units 1a and 1b, each of which provides a left eye display and a right eye display. In detail, the first and second projecting units respectively include a first and a second light source 4a and 4b, respectively, such as xenon lamps, first and second spherical reflecting mirrors 3a and 3b for reflecting the light emitted to the backward direction from the light sources, first and second collimating lenses 5a and 5b for condensing the emitting light as well as the reflected light from the spherical reflecting mirrors to transform the lights into parallel lights, first and second LCD (liquid crystal display) panels 6a and 6b (or a first and a second slide films), and first and second projecting lenses 7a and 7b. An observer perceives the projected image as a stereoscopic display through polarization spectacles 8.

In the above-mentioned three dimensional projection system, each of the projecting unit is controlled in order to accord the image and to adjust the focus. That is, in case that the images respectively projected from the projecting units onto a screen S1 are not accorded, and in case that the focusing is not adjusted because the distances between the projecting units and the screen are inaccurate, the projecting units are moved with respect to each other to complement the deviation by adjusting the projecting direction as well as a projecting angle.

Therefore, there are problems in that the adjusting operation is exceedingly troublesome and inconvenient. Furthermore, only a specialist can accomplish an exact adjusting operation because the adjusting operation should be performed by manual operation while staring at the images on screen S1.

In addition, in the above-mentioned three dimensional projection system, because light axes of the projecting units La and Lb are inclined at a predetermined angle with respect to a central axis of the screen L1, the distances from projecting lenses 7a and 7b to both left and right sides of screen S1 are different. Thus, the magnifying proportion of the images on the left side of the screen is different from that on the right side of the screen. As a result, as shown in FIG. 7A, there is a problem in that the two images are projected as a trapezoid in the vertical direction to not completely coincide with each other.

Such an appearance is called a keystoning phenomenon by which the screen is distorted (referring to FIG. 7A). If the keystoning phenomenon occurs, the observer's feeling of satisfaction is reduced and the fatigue of the observer's eyes is aggravated.

U.S. Pat. No. 5,125,733 (issued to Lee) discloses an apparatus for integrally operating a pair of projecting lenses in order to settle the above-mentioned problems. In this apparatus, the light axes of projecting objects, the light axes of projecting lenses, and the central axis of the screen are parallel to each other to accord two images projected onto the screen, thereby preventing the keystoning phenomenon.

As per the above-mentioned apparatus, an excellent image without trapezoidal distortion can be obtained. However, the construction of the apparatus is complicated and manufacturing thereof is difficult.

SUMMARY OF THE INVENTION

To solve the problems of the conventional art, it is an object of the present invention to provide a novel three dimensional projection system in which a pair of projecting lenses could be driven integrally and operation and control thereof are very accurate and advantageous, thereby eliminating a keystoning phenomenon and reducing the fatigue of an observer's eyes.

To accomplish the above-mentioned object there is provided in the present invention a three dimensional projection system comprising: a holder housing having an upper plate and a lower plate, a plurality of longitudinally inclined guiding holes symmetrically formed at both sides of the upper and lower plates and inclined at predetermined angles about the central axes of the upper and lower plates, and first and second opening portions, the first and second opening portions being formed in rear central portions of the upper and lower plates, respectively; first and second projecting lens holders having cylindrical shapes and being provided with projecting lenses formed in front sides thereof, the holders being arranged parallel to each other in the holder housing; movable pins protrusively formed on upper and lower portions of the first and second projecting lens holders, the movable pins being respectively inserted into corresponding longitudinally inclined guiding holes; a holder supporting plate having a pair of front and rear plates and a spacer for maintaining a distance between the front and rear plates, the front and rear plates being provided with first and second leg portions formed at both sides thereof and extended through the first opening portion onto an upper portion of the upper plate, and third and fourth leg portions extended through the second opening portion onto a lower portion of the lower plate, guiding grooves being formed at the leg portions for the movable pins being inserted thereinto; a driving means for supplying a driving power for transporting the projecting lens holders forward and backward; and a transporting means for transporting the driving power supplied from the driving motor to the projecting lens holders.

Particularly, screw holes are formed in the movable pins and the screw holes are screw combined with sliding pins from an upper portion of the upper plate and from a lower portion of the lower portion.

The diameters of the movable pins, the widths of the longitudinally inclined guiding holes, the widths of the guiding grooves and the length of the spacer are preferably the same.

The driving motor can be fixedly installed on a central portion of the lower plate and in the holder housing. The transporting means includes a driving gear and a driven gear.

A transporting gear can be formed on a central axis of the driven gear. A flange having a grooved portion which can be screw combined with the transporting gear, is fixedly installed on a surface of the front plate of the holder supporting plate so as to combine the screw with the grooved portion.

The flange can be combined by means of any method at a predetermined surface of the front plate of the holder supporting. The preferred method is a combination by screws.

In addition, the light axes of projecting lenses formed in front of the first and second projecting lens holders and a central axis of a screen are preferably parallel.

According to the three dimensional projection system of the present invention, a pair of projecting lenses can be integrally operated by a single driving motor, image controlling and focus adjusting are accurate and advantageous and the keystoning phenomenon can be eliminated.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, the constituting elements and the operation principle of the three dimensional projection system according to an embodiment of the present invention will be explained in more detail with reference to the accompanying drawings.

Figure 1:
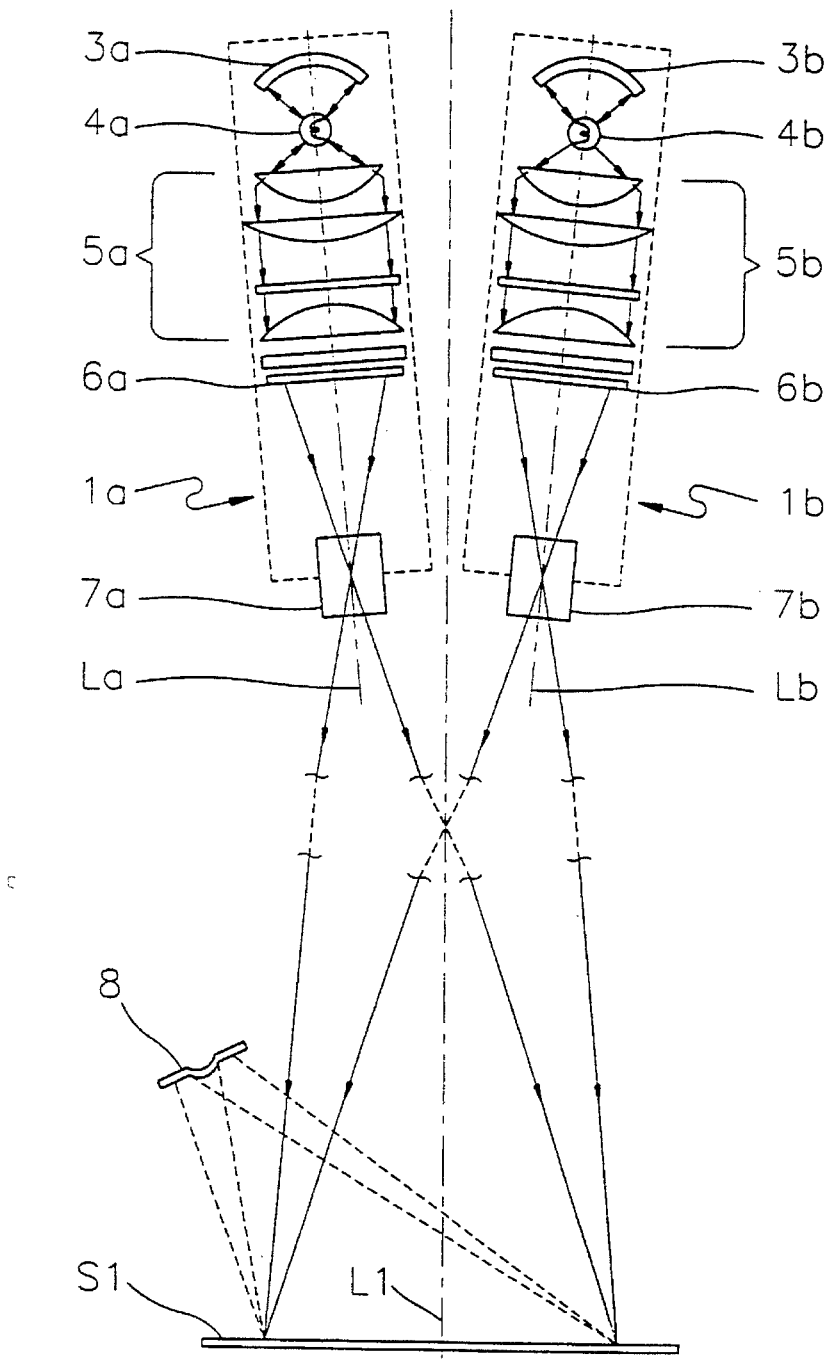
FIG. 1 is a schematic constitution view of the conventional three dimensional projection system.
Figure 2:
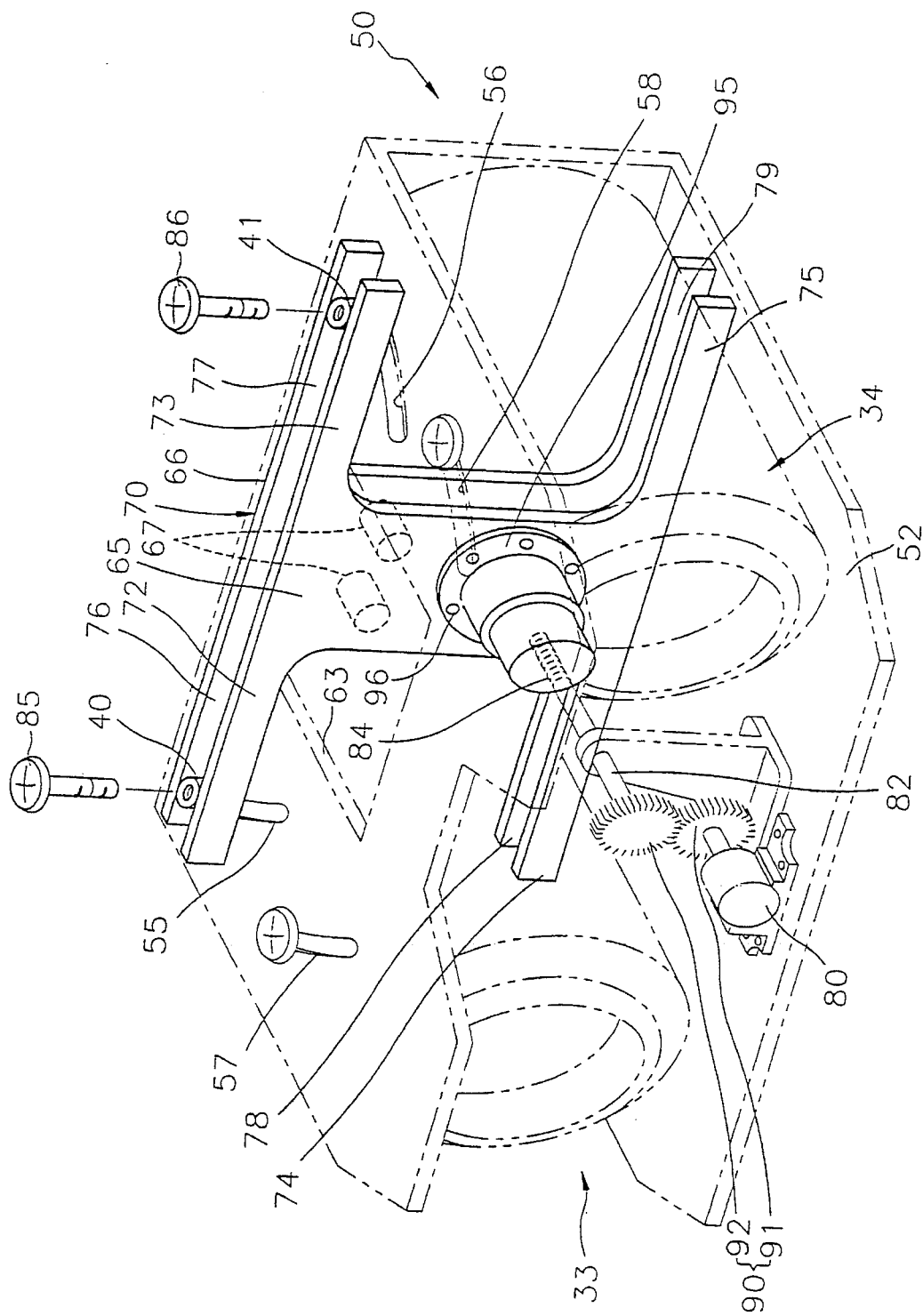
FIG. 2 is a schematic perspective view for the projecting lens driving apparatus of the three dimensional projection system according to the present invention.
Figure 3:
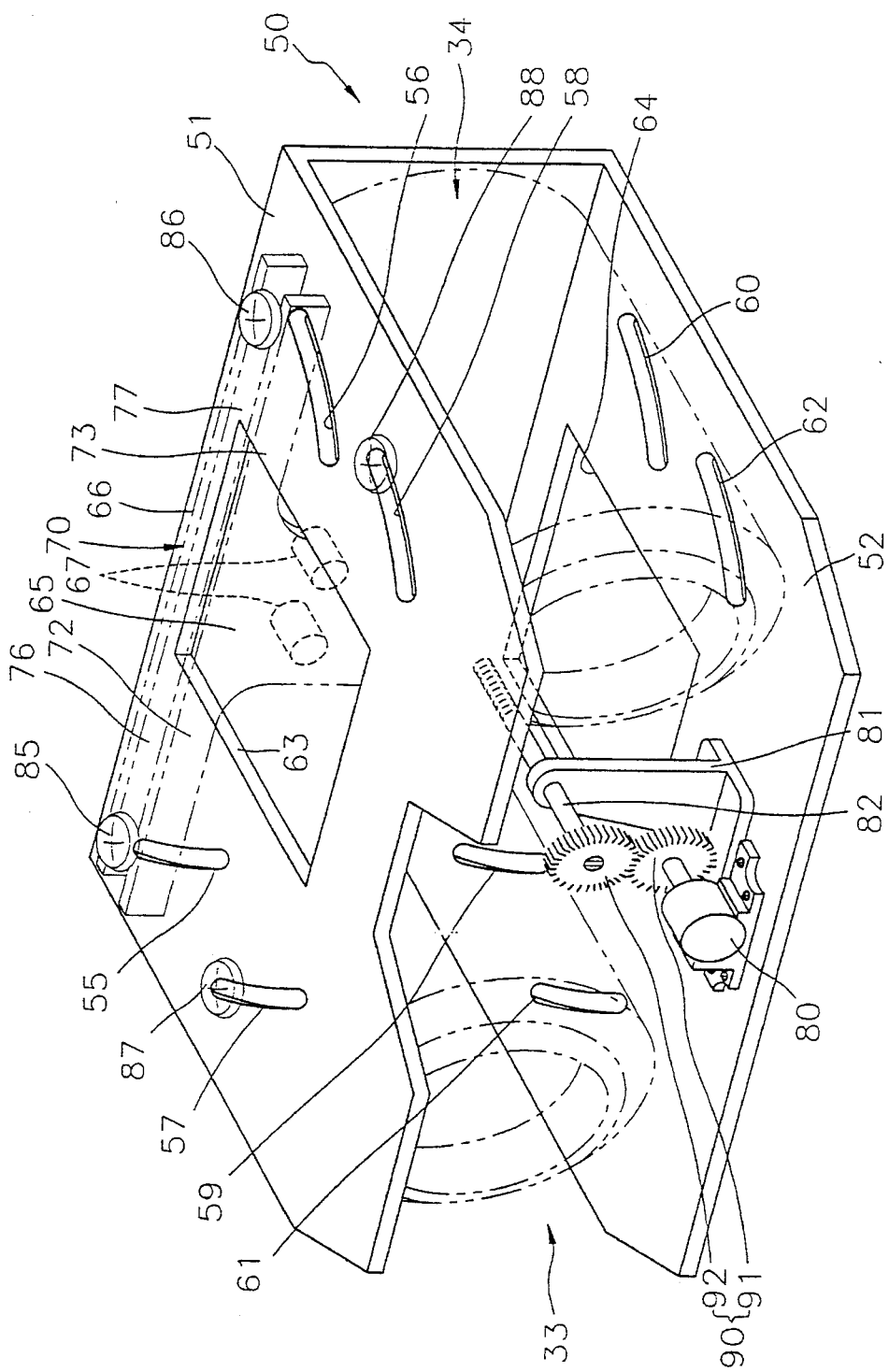
FIG. 3 is a schematic perspective view for showing the elements in detail of the projecting lens driving apparatus of the three dimensional projection system according to the present invention.
Figure 4:
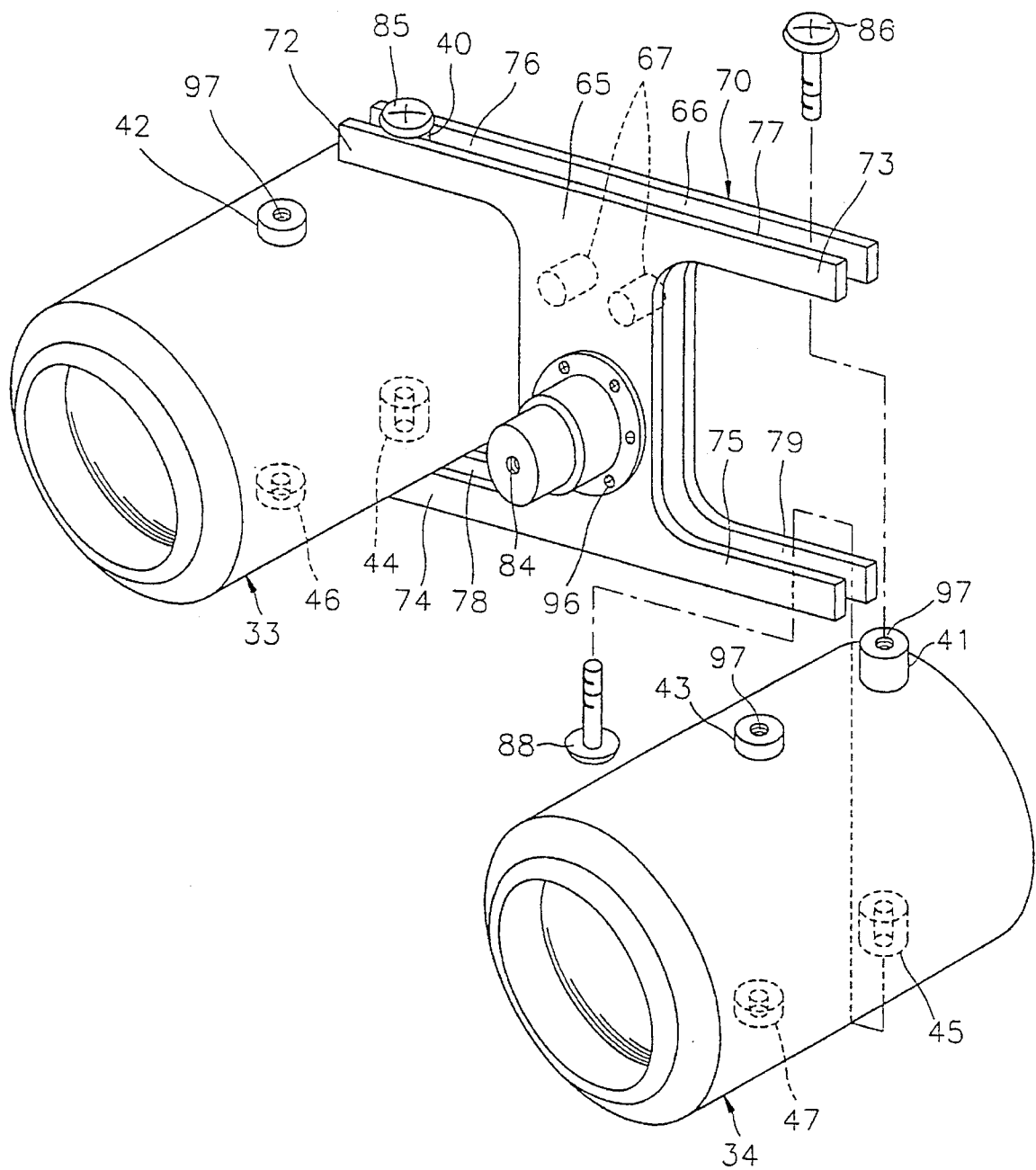
FIG. 4 is a partially exploded perspective view for showing the combination state of the holder supporting plate and the projecting lens holders of the three dimensional projection system according to the present invention.

FIGS. 2 and 3 are partial schematic constitution views of the projecting lens driving apparatus of the three dimensional projection system according to one embodiment of the present invention. FIG. 4 is a partially exploded perspective view for showing the combination state of a holder supporting plate and projecting lens holders.

Referring to FIGS. 2 and 3, the projecting lens driving apparatus mainly includes a holder housing 50 having an upper plate 51 and a lower plate 52, first and second projecting lens holders 33 and 34 which are formed in holder housing 50 and are provided in parallel to each other, and a holder supporting plate 70 having a 90° rotated H-shape and provided at the rear portion of holder housing 50.

At the rear portions of upper plate 51 and lower plate 52 of holder housing 50, first and second opening portions 63 and 64 are formed, respectively, and at both sides of upper and lower plates 51 and 52, a plurality of longitudinally inclined guiding holes 55, 56, 57, 58, 59, 60, 61 and 62 which are inclined at a predetermined angle with respect to the central axis of holder housing 50, are formed.

Movable pins 40, 41, 42, 43, 44, 45, 46 and 47 are protrusively formed at the upper and lower portions of first and second projecting lens holders 33 and 34. The movable pins are inserted into corresponding longitudinally inclined guiding holes 55, 56, 57, 58, 59, 60, 61 and 62 so that they can move within the guiding holes (refer to FIG. 4).

Holder supporting plate 70 has a front plate 65, a rear plate 66 and two spacers 67 for keeping the front and rear plates separately apart from each other at a predetermined distance. Holder supporting plate 70 has a 90° rotated H-shape. Leg portions 72, 73, 74 and 75 are extended to the upper portion of upper plate 51 through first opening portion 63 and to the lower portion of lower plate 52 through second opening portion 64. At leg portions 72, 73, 74 and 75, guiding grooves 76, 77, 78 and 79 are respectively formed by front plate 65 and rear plate 66. The widths of the guiding grooves and the lengths of spacers 67 inserted into front plate 65 and rear plate 66 are the same. In the drawings, two spacers 67 are provided. However, since the spacer is installed only for maintaining the distance between the front and the rear plates, the number of spacers can be optionally selected as necessary.

In guiding grooves 76, 77, 78 and 79, movable pins 40, 41, 44 and 45 which pass through longitudinally inclined guiding holes 55, 56, 59 and 60, are inserted. Therefore, four movable pins 40, 41, 44 and 45 which are located at the rear portions of the projecting lens holders are higher than four movable pins 42, 43, 46 and 47 which are located at the front portions by the height of the leg portions.

Movable pins 40, 41, 42, 43, 44, 45, 46 and 47 are combined by screws to the sliding pins through the screw holes formed at each of the centers of the movable pins. The sliding pins are preferably provided for preventing the separation of the movable pins. In the drawings, only four movable pins 85, 86, 87 and 88 which are provided at the upper plate and a movable pin 89 which is provided at one side of the rear portion of the lower plate are illustrated. However, the remaining movable pins 44, 46 and 47 which are provided at the remaining sides of the lower plate also are combined by screws to the sliding pins, although they are not shown.

A driving motor 80 and a power transporting device 90 are installed on the central portion of lower plate 52 and in holder housing 50. Power transporting device 90 has a driving gear 91 and a driven gear 92. Driven gear 92 is provided with a transporting screw 82 which is protrusively formed at the center of the driven gear toward holder supporting plate 70. Transporting screw 82 is supported by a screw supporter 81 which is fixedly formed on lower plate 52.

At the from side of holder supporting plate 70, a flange 85 having a grooved portion 84 which will be combined with transporting screw 82, is fixed by bolts 96. When the driving power of driving motor 80 is transported to transporting screw 82 through power transporting device 90, transporting screw 82 rotates at its original place because it is fixed by screw supporter 81. Accordingly, grooved portion 84 meshed with transporting screw 82 starts to move forward or backward according to the rotational direction of transporting screw 82.

The operational principle of the driving apparatus having the above-mentioned constitution will be described in detail below.

First, when driving motor 80 starts to be driven, driving gear 91 rotates in accordance to the rotational direction of driving motor 80 and driven gear 92 rotates in the opposite direction thereof. If driven gear 92 starts to rotate, transporting screw 82 which is protrusively formed thereon also starts to rotate. Since grooved portion 84 formed at the front portion of flange 95 which is fixedly installed at the from side of holder supporting plate 70, is meshed with transporting screw 82, the whole holder supporting plate 70 moves forward or backward according to the rotational direction of transporting screw 82.

When holder supporting plate 70 is transported forward, movable pins 40, 41, 44 and 45, which are inserted into guiding grooves 76, 77, 78 and 79 at leg portions 72, 73, 74 and 75, and the combined sliding pins are also transported forward along longitudinally inclined guiding holes 55, 56, 59 and 60. Along with holder supporting plate 70, projecting lens holders 33 and 34 are transported forward and the remaining movable pins 42, 43, 46 and 47 are also transported forward along longitudinally inclined guiding holes 57, 58, 61 and 62. Since movable pins 40, 41, 42, 43, 44, 45, 46 and 47 are transported along longitudinally inclined guiding holes 55, 56, 57, 58, 59, 60, 61 and 62, projecting lens holders 33 and 34 are transported forward and at the same time, gathered together along the passage of the longitudinally inclined guiding holes.

That is, by using a single motor, projecting lens holders 33 and 34 can be transported forward while being gathered together, or transported backward while being separated from each other.

Figure 5A:
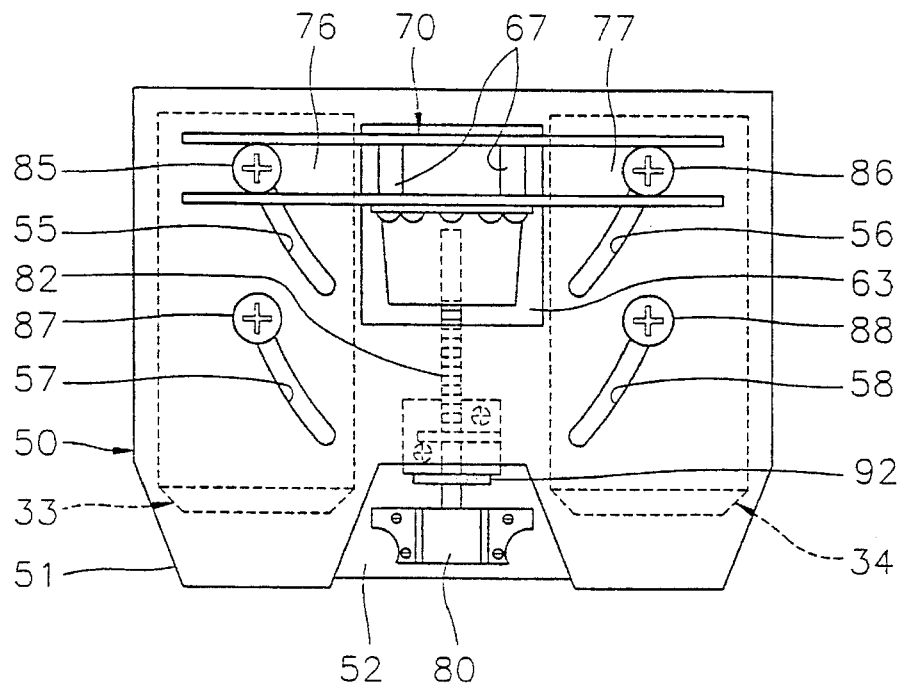
FIGS. 5A and 5B illustrate the operation of the projecting lens driving apparatus of the three dimensional projection system according to the present invention, wherein FIG. 5A corresponds to the state when each projecting lens holder is transported to the rear end position, while FIG. 5B corresponds to the state when each projecting lens holder is transported to the forefront position.
Figure 5B:
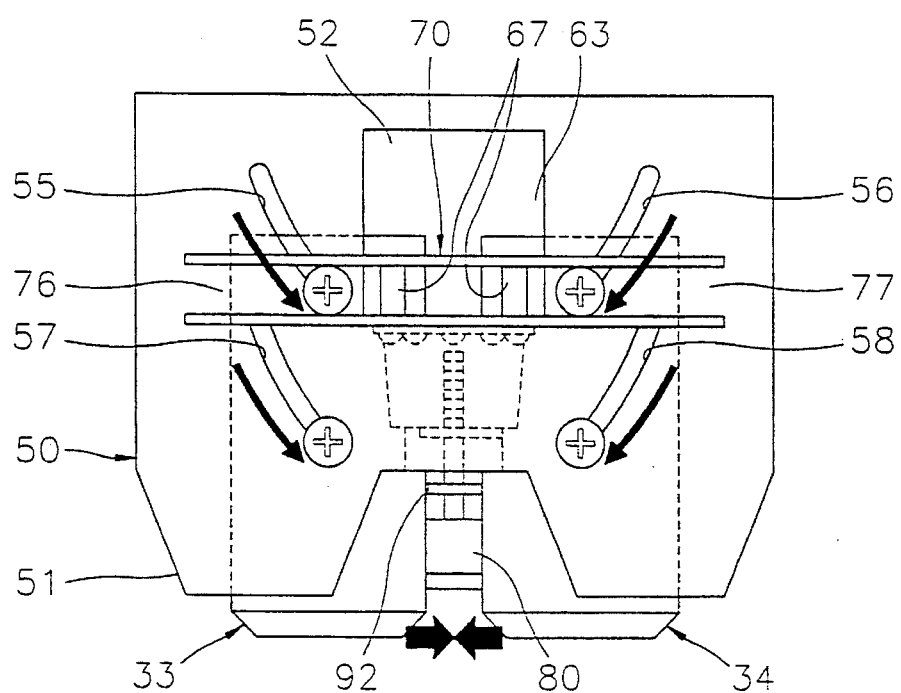

FIGS. 5A and 5B illustrate the operation of the projecting lens driving apparatus of the three dimensional projection system according to the present invention.

FIG. 5A corresponds to the state when each projecting lens holder is transported to the rear end position. At this time, the sliding pins which are provided on longitudinally inclined guiding holes 40, 41, 42, 43, 44, 45, 46 and 47 and on holder supporting plate 70 are positioned at their rear end position. Transporting screw 82 is drawn out from grooved portion 84 to the utmost. Accordingly, projecting lens holders 33 and 34 are located at their rear end position and, at the same time, they are separated to the utmost.

Along with the driving of driving motor 80, transporting screw 82 starts to rotate and grooved portion 84 is transported forward. Then, holder supporting plate 70 moves forward and projecting lens holders 33 and 34 also move forward as shown in FIG. 5B. At this time, the sliding pins move within the longitudinally inclined guiding holes and so projecting lens holders 33 and 34 move forward and gather together. At last, projecting lens holders 33 and 34 are positioned at the forefront and they are closed to the utmost.

If driving motor 80 is driven in the opposite direction, transporting screw 82 also rotates to the opposite direction and accordingly, holder supporting plate 70 is transported backward. Along with holder supporting plate 70, projecting lens holders 33 and 34 are now transported backward and they are separated from each other.

An operator could obtain a desired image by controlling the distance between projecting lens holders 33 and 34 and the screen and the distance between projecting lens holders 33 and 34 themselves, through operation of the rotational direction of driving motor 80.

Figure 6:
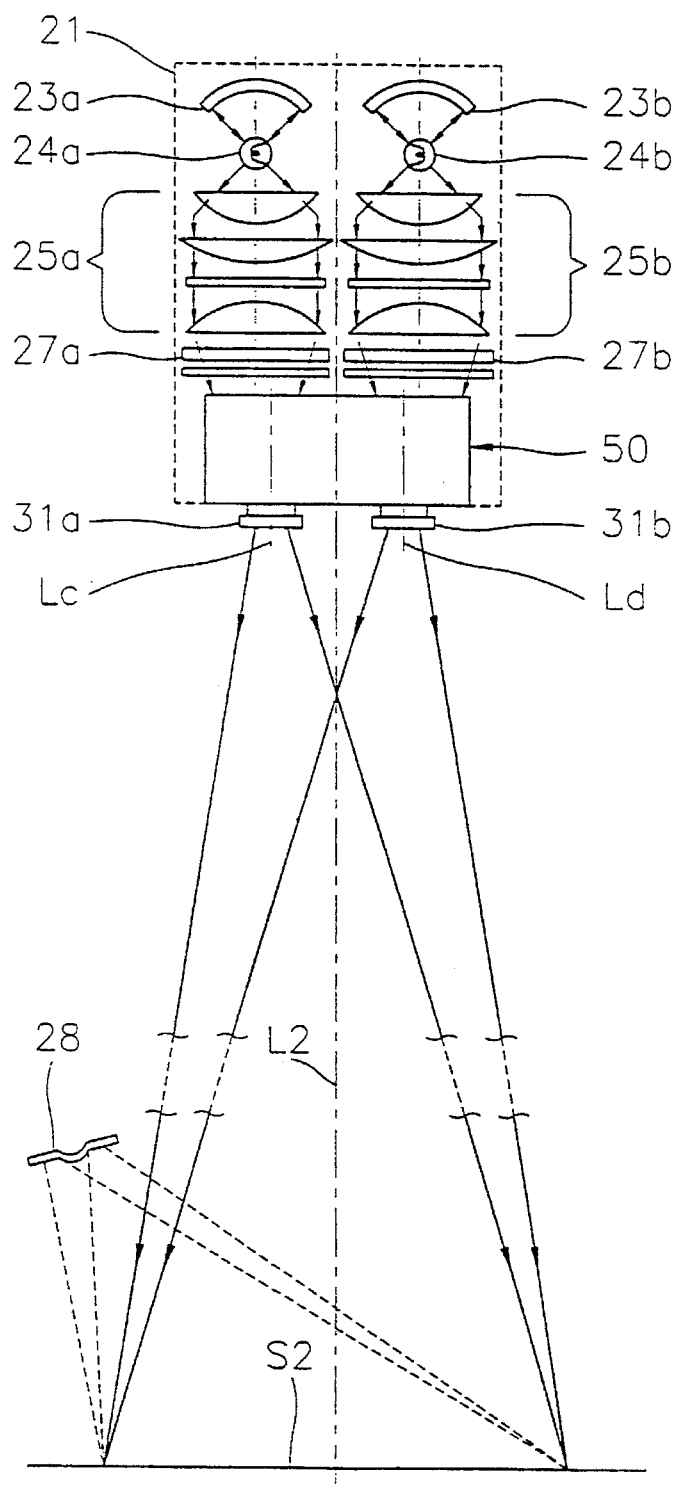
FIG. 6 is a schematic constitution view of the three dimensional projection system according to the present invention.

FIG. 6 is a schematic constitution view of the three dimensional projection system including the above-mentioned driving apparatus according to the present invention.

The system mainly includes a pair of projecting units for providing a left eye display and a right eye display. The projecting units are provided in a case 21 and each unit respectively includes a first and a second light sources 24a and 24b such as xenon lamps, a first and a second spherical reflecting mirrors 23a and 23b for reflecting forward the light emitted backward from the light sources, a first and a second collimating lenses 25a and 25b for condensing the emitted lights from the light sources and the reflected lights from the spherical reflecting mirrors and transforming the condensed lights into parallel lights, a first and a second LCD panels 27a and 27b (or a first and a second slide fills), and a first and a second projecting lenses 31a and 31b. An observer perceives the projected image as a stereoscopic display through polarization spectacles 28.

In the projection system according to the present invention, in contrast to the conventional projection system, the projecting lens holders are integrally provided in holder housing 70 and they are operated as a single apparatus.

In this kind of three dimensional projection system, the unit for the right eye display and the unit for the left eye display are operated integrally to accord the images and to control focusing. That is, control of the images projected on a screen S2 from each projecting unit is very simple and advantageous.

In addition, in the three dimensional projection system having the above-mentions constitution, the light axes of the LCD panels, i.e. the light axes of the projecting objects, first and second light axes of the projecting lenses Lc and Ld, and a central axis of the screen L2 are all parallel. Particularly and preferably, light axes of projecting lenses Lc and Ld are nearer to central axis of the screen L2 than to the light axes of the projecting objects. Thus, the keystoning phenomenon does not occur in the obtained image.

Figure 7A:
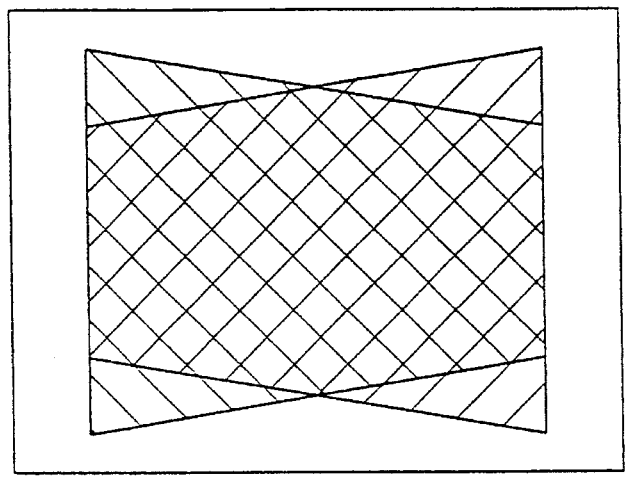
FIG. 7A illustrates images on a screen showing the keystoning phenomenon by using the conventional projection system.
Figure 7B:
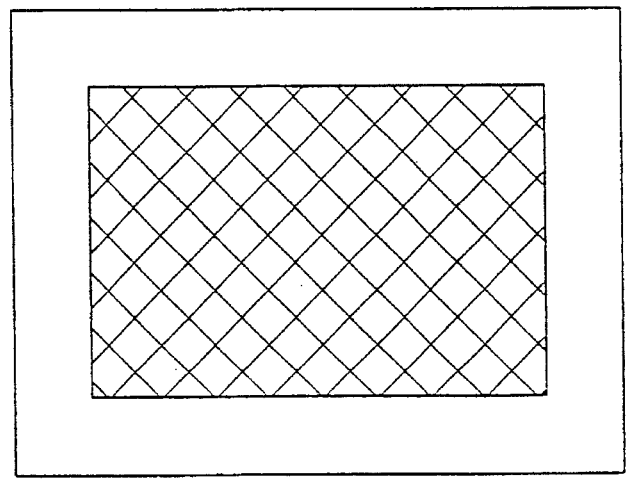
FIG. 7B illustrates images on a screen showing no keystoning phenomenon by using the three dimensional projection system according to the present invention.

FIG. 7A illustrates images on a screen showing the keystoning phenomenon by using the conventional projection system, and FIG. 7B illustrates images on a screen showing no keystoning phenomenon by using the three dimensional projection system according to the present invention.

As shown in FIGS. 7A & 7B, a completely coinciding image having no keystoning phenomenon can be obtained through the three dimensional projection system according to the present invention.

As described above, image controlling is very advantageous and thus the obtained image is good when employing the three dimensional projection system according to the present invention.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A three dimensional projection system comprising:

a holder housing having an upper plate and a lower plate, a plurality of longitudinally inclined guiding holes symmetrically formed at both sides of said upper and lower plates and inclined at predetermined angles about central axes of said upper and lower plates, and first and second opening portions, said first and second opening portions being formed in rear central portions of said upper and lower plates, respectively;

first and second projecting lens holders having cylindrical shapes and being provided with projecting lenses formed in front sides thereof, said holders being arranged in parallel in said holder housing;

movable pins protrusively formed on upper and lower portions of said first and second projecting lens holders, said movable pins being respectively inserted into corresponding longitudinally inclined guiding holes;

a holder supporting plate having a pair of front and rear plates and a spacer for maintaining a distance between said front and rear plates, said front and rear plates being provided with a first and a second leg portions formed at both sides thereof and extended through said first opening portion onto an upper portion of said upper plate, and a third and fourth leg portions extended through said second opening portion onto a lower portion of said lower plate, guiding grooves being formed at said leg portions for said movable pins being inserted thereinto;

driving means for supplying driving power for transporting said projecting lens holders forward and backward; and transporting means for transporting the driving power supplied from said driving means to said projecting lens holders.

2. The three dimensional projection system of claim 1, wherein screw holes are formed in said movable pins and the screw holes are combined by screws to sliding pins from an upper portion of said upper plate and from a lower portion of said lower portion.

3. The three dimensional projection system of claim 2, wherein two movable pins are respectively formed at both upper and lower portions of both first and second projecting lens holders, and four movable pins located at a rear side are higher than four movable pins located at a front side.

4. The three dimensional projection system of claim 1, wherein diameters of said movable pins, widths of said longitudinally inclined guiding holes, widths of said guiding grooves, and a length of said spacer are the same.

5. The three dimensional projection system of claim 1, wherein light axes of projecting lenses formed in front of said first and second projecting lens holders, and a central axis of a screen, are parallel.

6. The three dimensional projection system of claim 1, wherein said driving means is fixedly installed on a central portion of said lower plate and in said holder housing.

7. The three dimensional projection system of claim 6, wherein said transporting means includes a driving gear and a driven gear, and a transporting gear is formed on a central axis of said driven gear.

8. The three dimensional projection system of claim 7, wherein a flange having a grooved portion which can be screw combined with said transporting gear, is fixedly installed on a surface of said front plate of said holder supporting plate.

9. The three dimensional projection system of claim 8, wherein said flange is screw combined at a predetermined surface of said front plate of said holder supporting plate.

10. A three dimensional projection system comprising first and second projecting objects and first and second projecting lenses, for reproducing images on a screen by passing light through said projecting objects and said projecting lenses, characterized in that light axes of said first and second projecting objects, light axes of said first and second projecting lenses, and a central axis of said screen are parallel, and said projection system further comprises:

a holder housing having an upper plate and a lower plate, a plurality of longitudinally inclined guiding holes symmetrically formed at both sides of said upper and lower plates and inclined at predetermined angles about central axes of said upper and lower plates, and first and second opening portions, said first and second opening portions being formed in rear central portions of said upper and lower plates, respectively;

first and second projecting lens holders having cylindrical shapes and being provided with projecting lenses formed in front sides thereof, said holders being arranged in parallel in said holder housing;

movable pins protrusively formed on upper and lower portions of said first and second projecting lens holders, said movable pins being respectively inserted into corresponding longitudinally inclined guiding holes;

a holder supporting plate having a pair of front and rear plates and a spacer for maintaining a distance between said front and rear plates, said front and rear plates being provided with first and second leg portions formed at both sides thereof and extended through said first opening portion onto an upper portion of said upper plate, and third and fourth leg portions extended through said second opening portion onto a lower portion of said lower plate, guiding grooves being formed at said leg portions for said movable pins being inserted thereinto;

driving means for supplying driving power for transporting said projecting lens holders forward and backward; and transporting means for transporting the driving power supplied from said driving means to said projecting lens holders.

11. A three dimensional projection system comprising:

a holder housing having an upper plate and a lower plate, a plurality of longitudinally inclined guiding holes symmetrically formed at both sides of said upper and lower plates and inclined at predetermined angles about central axes of said upper and lower plates, and first and second opening portions, said first and second opening portions being formed in rear central portions of said upper and lower plates, respectively;

first and second projecting lens holders having cylindrical shapes and being provided with projecting lenses formed in front sides thereof, said holders being arranged in parallel in said holder housing;

movable pins protrusively formed on upper and lower portions of said first and second projecting lens holders, said movable pins being respectively inserted into corresponding longitudinally inclined guiding holes, said movable pins being provided with screw holes formed therein and said screw holes are screw combined with sliding pins from an upper portion of said upper plate and from a lower portion of said lower portion, two of said movable pins being respectively formed at both upper and lower portions of both first and second projecting lens holders, and four movable pins located at a rear side which are higher than four movable pins located at a front side;

a holder supporting plate having a pair of front and rear plates and a spacer for maintaining a distance between said front and rear plates, said front and rear plates being provided with first and second leg portions formed at both sides thereof and extended through said first opening portion onto an upper portion of said upper plate and a third and fourth leg portions extended through said second opening portion onto a lower portion of said lower plate, guiding grooves being formed at said leg portions for said movable pins being inserted thereinto;

a flange fixedly installed on a surface of said front plate of said holder supporting plate through screw combination, said flange having a grooved portion which can be screw combined with a transporting gear;

driving means fixedly installed on a central portion of said lower plate and in said holder housing for supplying driving power for transporting said projecting lens holders forward and backward; and a driving gear and a driven gear for transporting the driving power supplied from said driving means to said projecting lens holders, wherein diameters of said movable pins, widths of said longitudinally inclined guiding holes, widths of said guiding grooves, and a length of said spacer are the same.

* * * * *